(12) United States Patent
Kai et al.

(10) Patent No.: US 8,063,956 B2
(45) Date of Patent: Nov. 22, 2011

(54) IMAGE PICKUP DEVICE, IMAGE PICKUP METHOD AND INTEGRATED CIRCUIT

(75) Inventors: Kouji Kai, Fukuoka (JP); Ikuo Fuchigami, Fukuoka (JP)

(73) Assignee: Panasonic Corporation, Osaka (JP)

( * ) Notice: Subject to any disclaimer, the term of this patent is extended or adjusted under 35 U.S.C. 154(b) by 447 days.

(21) Appl. No.: 12/377,897

(22) PCT Filed: Feb. 27, 2008

(86) PCT No.: PCT/JP2008/000363
§ 371 (c)(1),
(2), (4) Date: Feb. 18, 2009

(87) PCT Pub. No.: WO2008/129758
PCT Pub. Date: Oct. 30, 2008

(65) Prior Publication Data
US 2010/0165153 A1 Jul. 1, 2010

(30) Foreign Application Priority Data
Apr. 9, 2007 (JP) ................................ 2007-101508

(51) Int. Cl.
*H04N 5/262* (2006.01)

(52) U.S. Cl. ..................................... 348/239; 348/222.1

(58) Field of Classification Search ............. 348/207.99, 348/222.1, 239
See application file for complete search history.

(56) References Cited

U.S. PATENT DOCUMENTS
2006/0170807 A1* 8/2006 Abe et al. ................. 348/333.05
2011/0080504 A1* 4/2011 Akahori ..................... 348/240.2

FOREIGN PATENT DOCUMENTS
JP 2004-109247 4/2004
JP 2005-175683 6/2005
JP 2006-211489 8/2006

OTHER PUBLICATIONS

Hidefumi Iwashita, "A Novel Trimming Method of Video Contents Based on Viewer's Operation Logs", Tokyo Institute of Technology, Nov. 8, 2006, pp. 55-56.
International Search Report mailed May 20, 2008 for International Application No. PCT/JP2008/000363.

* cited by examiner

*Primary Examiner* — Huy K Mai
(74) *Attorney, Agent, or Firm* — Wenderoth, Lind & Ponack, L.L.P.

(57) ABSTRACT

It is to reduce a recording capacity required for recording image data acquired by composition bracket photographing. In order to attain the object mentioned above, an image processing section designates a plurality of subject trimming images generated by respectively clipping out a plurality of subject images included in the picked-up image obtained by the correction circuit so as to set the plurality of designated subject trimming images as a first trimming image, sets an image encompassing the plurality of subject trimming images as a second trimming image, calculates a data size of the first trimming image with a data size of the second trimming image so as to compare the data sizes of the first trimming image and the second trimming image with each other, and selects one of the first trimming image and the second trimming image to be recorded in a recording section, whose data size is smaller than that of the other one.

9 Claims, 12 Drawing Sheets

F I G. 6
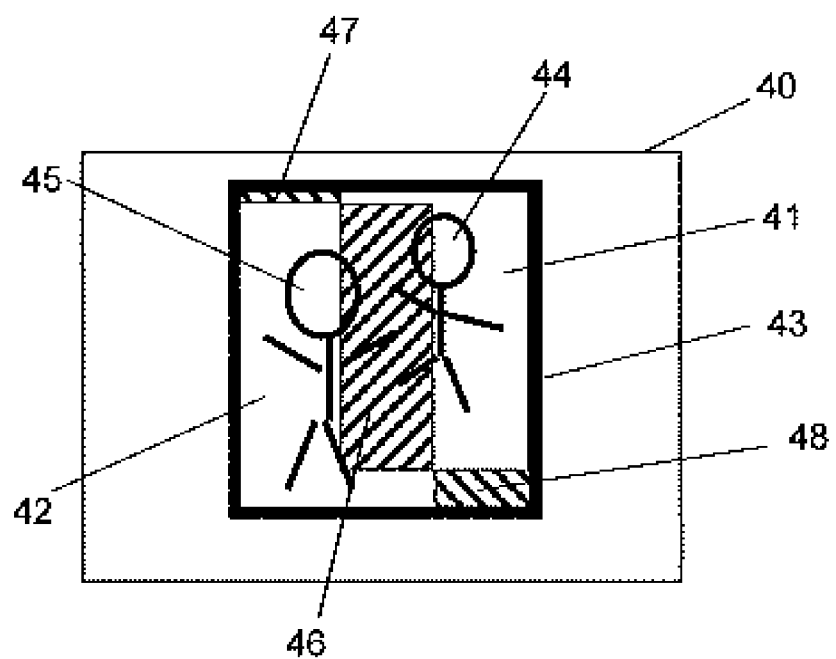

F I G. 1 1
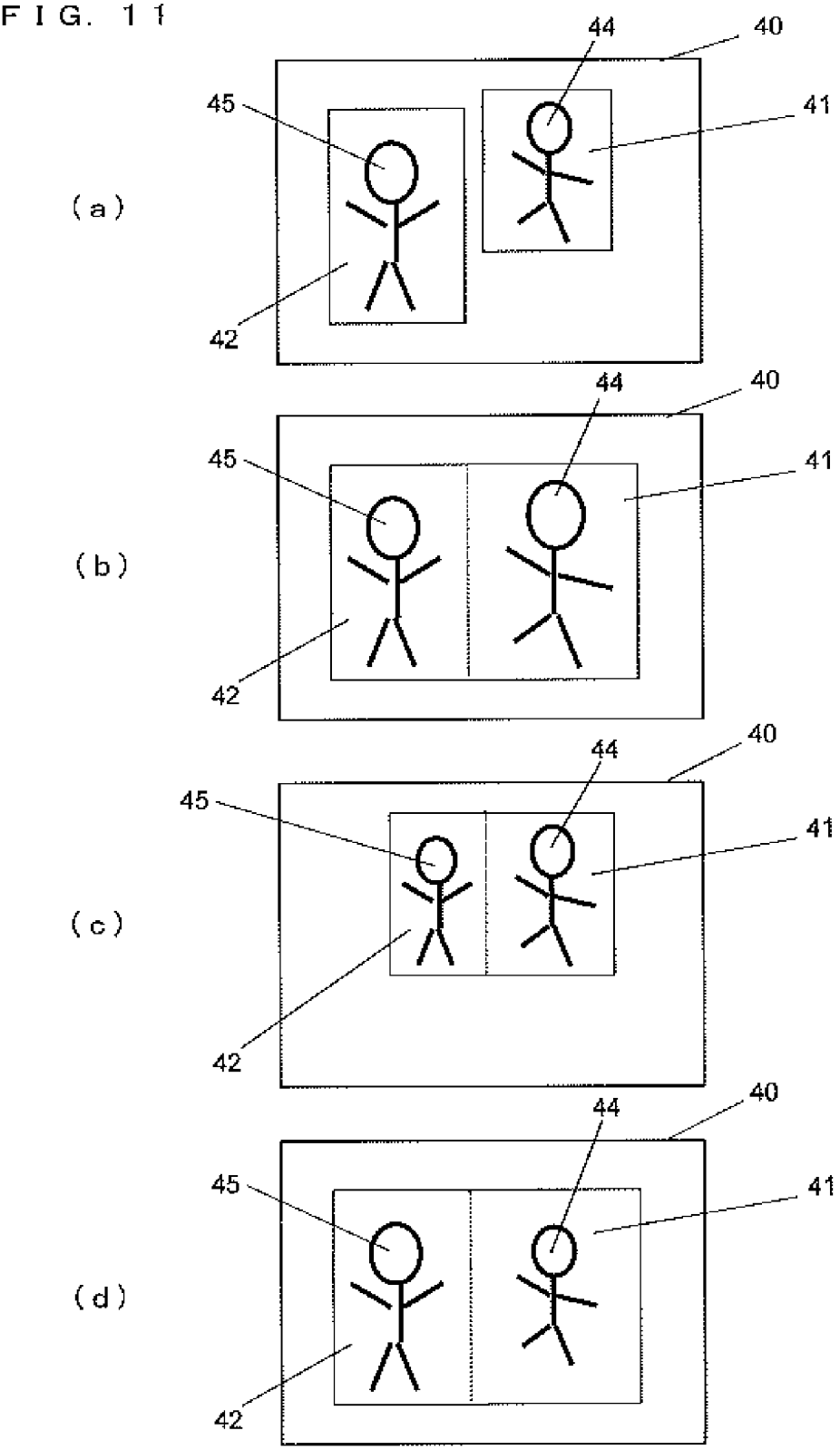

US 8,063,956 B2

IMAGE PICKUP DEVICE, IMAGE PICKUP METHOD AND INTEGRATED CIRCUIT

TECHNICAL FIELD

The present invention relates to an image pickup device, an image pickup method and an integrated circuit, all of which perform composition bracket photographing, and more particularly relates to an image pickup device, an image pickup method and an integrated circuit, all of which clip out, from a picked-up image, a plurality of still images including subjects that a user wishes to record.

BACKGROUND ART

Conventionally, in image pickup devices, if a user simply performs an operation of pressing a shutter button once, it is possible to acquire a plurality of still images whose compositions are different from each other. Hereinafter, an operation, of pressing a shutter button, which is performed by the user is referred to as a shutter pressing operation. Also, photographing which acquires a plurality of still images whose compositions are different from each other by only one shutter operation performed by the user, as described above, is referred to as composition bracket photographing.

As a conventional image pickup device that performs the composition bracket photographing, there is an image pickup device disclosed in Japanese Laid-Open Patent Publication No. 2004-109247 (patent document 1), for example. FIG. 15 is a diagram illustrating composition bracket photographing performed by the conventional image pickup device disclosed in patent document 1. In the image pickup device according to patent document 1, when the user performs a shutter pressing operation, a lens position of a zoom lens is shifted from a first position (a region R0) set by the user at a time point when the shutter pressing operation is performed to a second point (a region R1) which is positioned within an angle range wider than that of the first position. Thereafter, the image pickup device of patent document 1 photographs a wide-angle image (the region R1) by means of a CCD image pickup device. Thereafter, the image pickup device of patent document 1 extracts, as a plurality still images, a plurality of regions (the regions R0, R2) whose sizes each corresponds to an angle of view of the first position and whose positions in the photographed image (the region R1) are different from each other. Thus, the image pickup device of patent document 1 acquires a plurality of still images whose compositions are different from each other by one shutter pressing operation performed by the user.

As another conventional image pickup device that performs the composition bracket photographing, there is an image pickup device disclosed in Japanese Laid-Open Patent Publication No. 2006-211489 (patent document 2), for example. FIG. 16 is a diagram illustrating composition bracket photographing performed by a conventional image pickup device disclosed in patent document 2. In the image pickup device of patent document 2, when the user selects a zoom continuous shooting mode, a plurality of zoom continuous shooting frames are displayed as preview images together with a through image of a subject. Then, the image pickup device of patent document 2 updates preciously-stored trimming positions of the zoom continuous shooting frames in accordance with a cross-key operation performed by the user, so as to display zoom continuous frames (20a, 20b) at the most recently-stored trimming positions which have been updated. In the image pickup device of patent document 2, when the user performs the shutter pressing operation, a still image shooting processing is started, and still images acquired by the still image shooting processing are stored in a buffer memory. Then, the image pickup device of patent document 2 generates a still image included in a zoom continuous shooting frame 20a and a still image included in a zoom continuous shooting frame 20b based on the acquired still images through trimming processing, and stores both of the generated still images in the buffer memory. Thereafter, the image pickup device of patent document 2 stores still image acquired by photograph processing and the generated still images in a flash memory. Note that in the image pickup device of patent document 2, a plurality of still images acquired by executing the above processing are stored as a group of images. As such, the image pickup device of patent document 2 acquires a plurality of still images whose compositions are different from each other by one shutter pressing operation performed by the user.

[patent document 1] Japanese Laid-Open Patent Publication No. 2004-109247

[patent document 2] Japanese Laid-Open Patent Publication No. 2006-211489

DISCLOSURE OF THE INVENTION

Problems to be Solved by the Invention

As described above, the composition bracket photographing is a function which can acquire a plurality of still images when the user performs a shutter pressing operation once. Thus, in the case where composition bracket photographing is performed by the conventional image pickup devices mentioned above, the number of acquired still images is greater than the number of times the user performs the shutter pressing operation, thereby resulting in a substantial increase in data amount of the still images to be stored. As a result, a large-capacity storage is required for such conventional image pickup devices. Specifically, if the user performs the composition bracket photographing the same number of times, in a setting where still images having four different compositions are acquired each time composition bracket photographing is performed, the conventional image pickup devices require a recording capacity four times as large as that required for performing the photographing in a normal setting (where only one still image is acquired each time the shutter pressing operation is performed).

Therefore, for solving the problem mentioned above, an object of the present invention is to provide an image pickup device, an image pickup method and an integrated circuit, all of which are capable of reducing a recording capacity required when storing still images acquired by the composition bracket photographing in a recording section.

Solution to the Problems

The present invention is directed to an image pickup device that performs composition bracket photographing. To achieve the object mentioned above, the image pickup device of the present invention comprises: an image pickup section operable to pick up a subject so as to acquire a picked-up image; an image processing section operable to process the picked-up image acquired by the image pickup section; and a recording section operable to record the picked-up image processed by the image processing section, wherein the image processing section includes: subject trimming image designating means for designating a plurality of subject trimming images generated by respectively clipping out a plurality of subject images included in the picked-up image acquired by the image pickup section; first trimming image setting means for setting the plurality of subject trimming images as a first trimming image; second trimming image setting means for setting an image encompassing the plurality of subject trimming images as a second trimming image; first data size calculating means for calculating a data size of the first trimming image; second data size calculating means for calculating a data size of the second trimming image; comparison means for comparing the data size of the first trimming image with the data size of the second trimming image; and selection means for selecting one of the first trimming image and the second trimming image to be recorded in the recording section, one of the first trimming image and the second trimming image determined by the comparison means that the data size of the selected image is smaller than that of the other one.

Thus, in the image pickup device of the present invention, the data size of an image to be recorded in the recording section can be reduced, thereby making it possible to reduce the recording capacity of the recording section.

Furthermore, each of the plurality of subject trimming images designated by the subject trimming image designating means may have a rectangular shape, and the second trimming image set by the second trimming image setting means may have a rectangular shape.

Preferably, the second trimming image set by the second trimming image setting means does not include any area which is not included in the plurality of subject trimming images.

Thus, in the image pickup device of the present invention, the data size of the image to be recorded in the recording section can be further reduced, thereby making it possible to further reduce the recording capacity of the recording section.

Furthermore, each of the plurality of subject trimming images designated by the subject trimming image designating means may have a rectangular shape, and when the first trimming image is selected, the selection means may process the plurality of subject trimming images into the first trimming image having a rectangular shape by enlarging or reducing at least one of the plurality of subject trimming images so as to be aligned with the other subject trimming images.

Thus, when the user views the first trimming image, the appearance thereof is improved.

Furthermore, the data size of the first trimming image calculated by the first data size calculating means is a data size obtained after a compression process is performed, and the data size of the second trimming image calculated by the second data size calculating means is a data size obtained after a compression process is performed.

Thus, even in the case where compressed image data is recorded in the recording section, it becomes possible to reduce the data size of the image to be recorded in the recording section in an appropriate manner.

Furthermore, the picked-up image acquired by the image pickup section may be a real-time moving image in which real-time movement of the subject is reflected, and the subject trimming image designating means may track the plurality of subject images included in the real-time moving image so as to designate the plurality of subject trimming images generated by respectively clipping out the plurality of subject images.

Thus, the user can perform the composition bracket photographing a plurality of times by only designating the plurality of subject images within the real-time moving image once.

Note that the respective means included in the image processing section described above realize processes of the following steps constituting flowcharts (to be described in detail later) shown in FIGS. 2, 7, 10, 12 and 13. The subject trimming image designating means realizes processes of steps S103, S510 and S520. The first trimming image setting means realizes processes of steps S104 and S504. The second trimming image setting means realizes processes of steps S106 and S206. The first data size calculating means realizes processes steps S105 and S405. The second data size calculating means realizes steps S107 and S407. The comparison means realizes processes of steps S108, S208 and S408. The selection means realizes processes of steps S109, S110, S310, S409 and S410.

The present invention is also directed to an image pickup method that performs composition bracket photographing. To achieve the object mentioned above, the image pickup method of the present invention comprises: an image pickup step of picking up a subject so as to acquire a picked-up image; an image processing step of processing the picked-up image acquired in the image pickup step; and a recording step of recording the picked-up image processed in the image processing step, wherein the image processing step includes the steps of: designating a plurality of subject trimming images generated by respectively clipping out a plurality of subject images included in the picked-up image acquired by the image pickup section; setting the plurality of subject trimming images as a first trimming image; setting an image encompassing the plurality of subject trimming images as a second trimming image; calculating a data size of the first trimming image; calculating a data size of the second trimming image; comparing the data size of the first trimming image with the data size of the second trimming image; and selecting one of the first trimming image and the second trimming image to be recorded in the recording step, one of the first trimming image and the second trimming image determined by the step of comparing the data size of the first trimming image with the data size of the second trimming image that the data size of the selected image is smaller than that of the other one.

Thus, in the image pickup method of the present invention, the data size of the image to be recorded can be reduced, thereby making it possible to reduce a recording capacity.

The present invention is also directed to an integrated circuit integrated into an image pickup device that performs composition bracket photographing which processes a picked-up image acquired by picking up a subject and records the processed image. To achieve the object mentioned above, the integrated circuit of the present invention executes functions as: a signal processing/AD conversion circuit for performing a noise reduction processing and a gain control on an output signal of a CCD for picking up a subject and for converting the output signal from an analog signal into a digital signal; a correction circuit for performing an image correction processing on the output signal of the signal processing/AD conversion circuit so as to obtain the picked-up image; and an image processing section for designating a plurality of subject trimming images generated by respectively clipping out a plurality of subject images included in the picked-up image obtained by the correction circuit so as to set the plurality of designated subject trimming images as a first trimming image, for setting an image encompassing the plurality of subject trimming images as a second trimming image, for calculating a data size of the first trimming image with a data size of the second trimming image so as to compare the data sizes of the first trimming image and the second trimming image with each other, and for selecting one of the first trimming image and the second trimming image to be recorded, whose data size is smaller than that of the other one.

Thus, in the integrated circuit of the present invention, the data size of the image to be recorded can be reduced, thereby making it possible to reduce a recording capacity.

Effect of the Invention

As described above, according to an image pickup device, an image pickup method and an integrated circuit of the present invention, it becomes possible to reduce a recording capacity required when recording data of still images acquired by the composition bracket photographing in a recording section. Thus, the image pickup device, the image pickup method and the integrated circuit of the present invention can further reduce a capacity of the recording section as compared to the conventional image pickup devices.

BRIEF DESCRIPTION OF THE DRAWINGS

FIG. 6 is a diagram describing a case where the still image 40 shown in FIG. 3 includes the image superimposed portion 46.

FIG. 11 is a diagram describing a process to be executed by a CPU 13-3 in step S310.

FIG. 14 is a diagram describing step S510 and the like.

Figure 1:
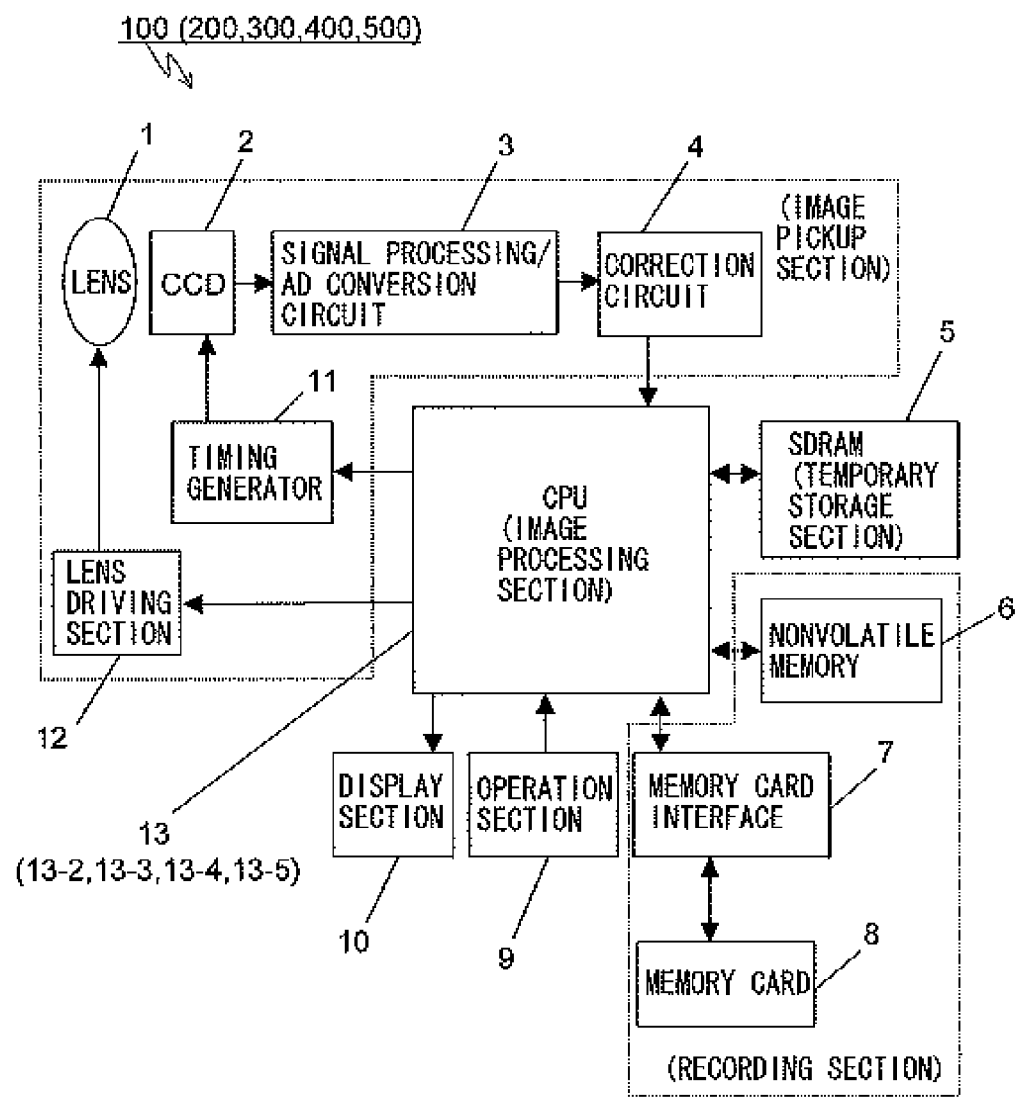
FIG. 1 is a block diagram illustrating an exemplary configuration of an image pickup device 100 according to a first embodiment.

DESCRIPTION OF THE REFERENCE CHARACTERS 1 lens
2 CCD
3 signal processing/AD conversion circuit
4 correction circuit
5 SDRAM
6 nonvolatile memory
7 memory card interface
8 memory card
9 operation section
10 display section
11 timing generator
12 lens driving section
13, 13-2, 13-3, 13-4, 13-5 CPU
100, 200, 300, 400, 500 image pickup device

BEST MODE FOR CARRYING OUT THE INVENTION

First Embodiment

FIG. 1 is a block diagram illustrating an exemplary configuration of an image pickup device 100 according to a first embodiment. As shown in FIG. 1, the image pickup device 100 comprises a lens 1, a CCD (Charge Coupled Device) 2, a signal processing/AD conversion circuit 3, a correction circuit 4, an SDRAM (Synchronous Dynamic Random Access Memory) 5, a nonvolatile memory 6, a memory card interface 7, a memory card 8, an operation section 9, a display section 10, a timing generator 11, a lens driving section 12, and a CPU 13. Note that since the memory card 8 is detachable from the image pickup device 100, the memory card 8 may not be included in the image pickup device 100. Also, the nonvolatile memory 6, the memory card interface 7 and the memory card 8 may be generically referred to as a recording section. Furthermore, the lens 1, the CCD 2, the signal processing/AD conversion circuit 3, the correction circuit 4, the timing generator 11 and the lens driving section 12 may be generically referred to as an image pickup section. Still furthermore, the CPU 13 may be referred to as an image processing section. Also, the SDRAM 5 may be referred to as a temporary storage section.

Hereinafter, an operation of the image pickup device 100 will be simply described with reference to FIG. 1. The lens 1 forms an image of a subject (not shown) (hereinafter, referred to as a subject image) on the CCD 2. The CCD 2 converts the subject image which has been formed as an optical signal into an electrical signal, thereby imaging the subject. The signal processing/AD conversion circuit 3 performs a noise reduction processing and gain control oh the electrical signal outputted from the CCD 2, thereby converting the output signal from an analog signal into a digital signal. The correction circuit 4 performs an image correction processing such as white balance (white color correction), gamma correction, and color correction on the digital signal outputted from the signal processing/AD conversion circuit 3. By executing the processing mentioned above, a real-time moving image of the subject (hereinafter, referred to as a real-time moving image) is acquired. The SDRAM 5 temporarily stores a still image created by using the real-time moving image in accordance with a shutter pressing operation of a user. The CPU 13 performs a characteristic process, which is to be described in detail later, on the still image stored in the SDRAM 5, and records the still image in which the aforementioned process has been performed in the nonvolatile memory 6 or the memory card 8 via the memory card interface 7. The timing generator 11 controls a timing at which the CCD 2 outputs an electrical signal to the signal processing/AD conversion circuit 3. The lens driving section 12 controls a position of the lens 1, thereby allowing the image pickup device 100 to perform a focus operation or a zoom operation. The display section 10 displays the real-time moving image and the still image stored in the SDRAM 5. Furthermore, the display section 10 also displays the still image recorded in the memory card 8 or the nonvolatile memory 6. The operation section 9 is a shutter button, a cursor button or the like, and an instruction from the user is inputted to the operation section 9. The CPU 13 controls a series of operations performed by the image pickup device 100, which have been described above.

Figure 2:
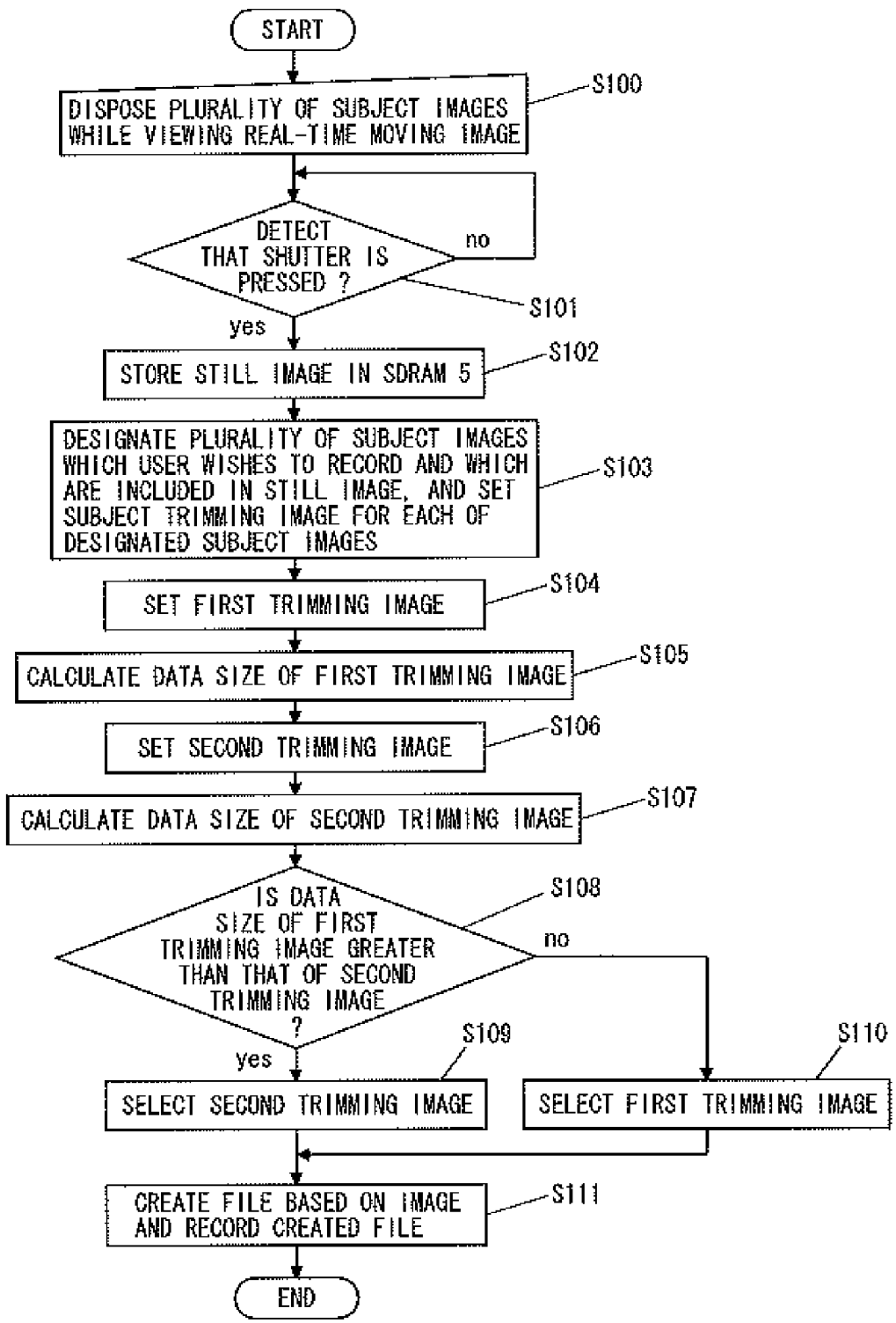
FIG. 2 is a flowchart describing a characteristic process to be executed by the image pickup device 100 from when a subject is picked up to when a still image is recorded in the recoding section included therein.

FIG. 2 is a flowchart describing a characteristic process to be executed by the image pickup device 100 from when a subject is picked up to when a still image is recorded in the recording section included therein. Hereinafter, an operation of the image pickup device 100 will be described with reference to FIG. 2.

Figure 3:
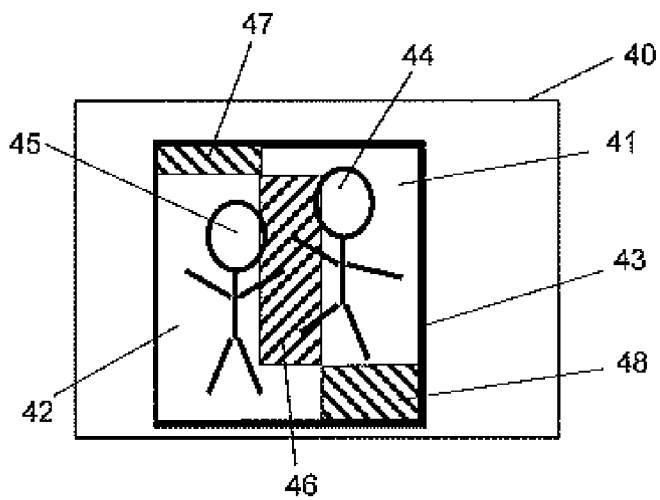
FIG. 3 is a diagram illustrating an example of a still image 40 stored in an SDRAM 5 in step S102 of FIG. 2.

The user disposes, in a frame, a plurality of subject images that the user wishes to record as a still image, while viewing a real-time moving image displayed on the display section (step S100). Note that a subject is a person, an animal, a vehicle, a plant, a building and the like. Next, when the CPU 13 detects a shutter pressing operation via the operation section 9 in step S101, the process proceeds to step S102. When the CPU 13 does not detect a shutter pressing operation in step S101, the CPU 13 stands by. Then, in step S102, the CPU 13 creates a still image by using the real-time moving image outputted from the correction circuit 4, and temporarily stores the still image in the SDRAM 5. FIG. 3 is a view illustrating an example of a still image 40 stored in the SDRAM 5 in step S102 shown in FIG. 2. Hereinafter, the above operation will be more specifically described with reference to FIG. 3.

Next, in step S103, in accordance with an instruction from the user, the CPU 13 designates, one by one, a plurality of subject images 44 and 45 that the user wishes to record, which subject images are included in the still image 40 stored in the SDRAM 5. In step S103, the CPU 13 sets, in the still image 40, a rectangular-shaped subject trimming image 41 including the subject image 44 and a rectangular-shaped subject trimming image 42 including the subject image 45. In this case, the user designates the plurality of subject images 44 and 45 that the user wishes to record, which subject images are included in the still image 40, by using the operation section 9 while viewing the display section 10 on which the still image 40 stored in the SDRAM 5 is displayed. FIG. 3 illustrates an example where the user designate the subject image 44 representing a person and the subject image 45 also representing a person.

Note that the subject trimming image 41 may include an entirety or a portion (a face or the like) of the subject image 44. Similarly, the subject trimming image 42 may include an entirety or a portion (a face or the like) of the subject image 45. Furthermore, each of the subject trimming images 41 and 42 may be set to have a rectangular shape in which a center thereof is positioned at a point designated by the user, which point is included in the still image 40. Or each of the images 41 and 42 may be set by using any other well-known arts. Furthermore, a shape of each of the subject trimming images 41 and 42 may be any other types such as polygon, ellipse or circle. Furthermore, the plurality of subject trimming images 41 and 42 may have sizes and shapes different from each other. The user may designate three or more subject images first and then three or more subject trimming images of the respective three or more designated subject images may be set.

Next, the CPU 13 extracts, one by one, the plurality of subject trimming images 41 and 42 set in step S103 so as to be set as a first trimming image (step S104).

Then, the CPU 13 calculates a data size of the first trimming image extracted in step S104 (step S105). Specifically, the CPU 13 calculates an area of the subject trimming image 41 and an area of the subject trimming image 42 so as to sum up the two obtained results, thereby calculating the data size of the first trimming image. Note that the area of the subject trimming image 41 is calculated by using the number of pixels constituting the subject trimming image 41. The area of the subject trimming image 42 is calculated in a similar manner as described above.

Next, the CPU 13 extracts a rectangular-shaped subject trimming image 43 which is an image encompassing the subject trimming images 41 and 42 so as to be set as a second trimming image (step S106).

Then, the CPU 13 calculates a data size of the second trimming image extracted in step S106 (step S107). Specifically, the CPU 13 calculates a data size of the second trimming image by calculating an area of the second trimming image. Note that the area of the second trimming image is calculated by using the number of pixels constituting the second trimming image. Furthermore, a shape of the second trimming image may be any other types such as polygon, ellipse or circle. Note that the second trimming image (the subject trimming image 43) includes extended areas 47 and 48, both are not included in the subject trimming image 41 or 42. Also, a portion in which the subject trimming image 41 and the subject trimming image 42 overlap each other is referred to as an image superimposed portion 46.

Figure 4:
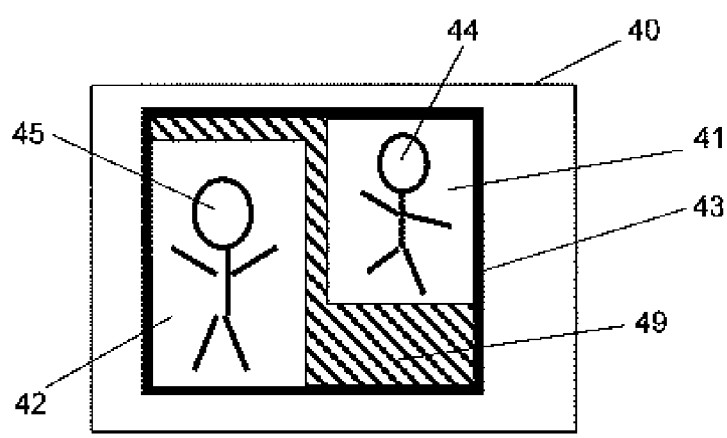
FIG. 4 is a diagram describing a case where the still image 40 shown in FIG. 3 does not include an image superimposed portion 46.
Figure 5:
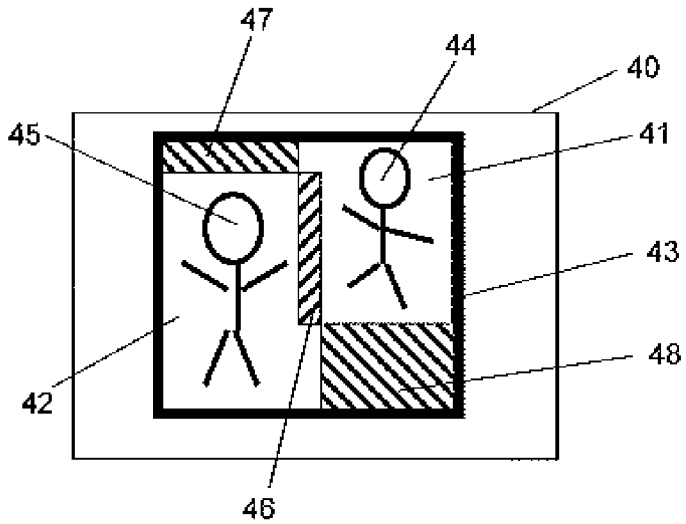
FIG. 5 is a diagram describing a case where the still image 40 shown in FIG. 3 includes the image superimposed portion 46.

FIG. 4 is a diagram describing a case where the still image 40 includes no image superimposed portion 46. Note that the still image 40 shown in FIG. 4 includes an extended area 49. FIGS. 5 and 6 are diagrams describing a case where the still image 40 shown in FIG. 3 includes the image superimposed portion 46. Hereinafter, step S108 will be described with reference to FIGS. 3 to 6.

In step S108, the CPU 13 determines whether or not the data size of the first trimming image calculated in step S105 is greater than that of the second trimming image calculated in step S107. The determination in step S108 can be made by comparing the area of the first trimming image with the area of the second trimming image, for example. Specifically, as shown in FIG. 6, when the area of the first trimming image (the sum of the area of the subject trimming image 41 and the area of the subject trimming image 42) is greater than the area of the second trimming image (the area of the subject trimming image 43), it is determined that the data size of the first trimming image is greater than that of the second trimming image, and the process proceeds to step S109. On the other hand, as shown in FIGS. 4 and 5, when the area of the first trimming image is smaller than that of the second trimming image, it is determined that the data size of the first trimming image is smaller than that of the second trimming image, and the process proceeds to step S110.

Note that in step S108, when it is determined that the area of the first trimming image is equal to that of the second trimming image, the process may proceed to any step selected by the user or may be previously set to proceed to a predetermined step.

In step S109, the CPU 19 selects the second trimming image set in step S106. Next, the CPU 13 creates a file based on the selected second trimming image, and records the created file in the nonvolatile memory 6 or the memory card 8 (step S111). Note that the user may select either the nonvolatile memory 6 or the memory card 8 as a location at which the second trimming image is to be recorded, or either the nonvolatile memory 6 or the memory card 8 may be previously set to record the second trimming image.

In step S110, the CPU 13 selects the first trimming image set in step S104. In other words, in step S110, the CPU 13 selects the subject trimming image 41 and the subject trimming image 42. Then, the CPU 13 crates a file based on the selected first trimming image, and records the created file in the nonvolatile memory 6 or the memory card 8 (step S111). Note that the CPU 13 may record the subject trimming images 41 and 42 as one file or record the two images as individual files. When the subject trimming images 41 and 42 are recorded as individual files, those files may be associated with each other. Thus, when the user or the like views the recorded images at a later time, he or she is able to easily simultaneously view the subject images 44 and 45 obtained at the same point of time. Note that the user may select either the nonvolatile memory 6 or the memory card 8 as a location at which the second trimming image is to be recorded, or either the nonvolatile memory 6 or the memory card 8 may be previously set to record the second trimming image.

In the case where the composition bracket photographing continues, the above-described steps will be repeated.

As described above, the image pickup device 100 according to the first embodiment designates the plurality of subject images 44 and 45 included in the acquired still image 40, so as to set the subject trimming images 41 and 42 including the subject images 44 and 45, respectively. Then, the sum of the data sizes of the plurality of subject trimming images 41 and 42 (the data size of the first trimming image) is compared with the data size of the subject trimming image 43 encompassing the plurality of the subject trimming images 41 and 42 (the data size of the second trimming image). When the data size of the first trimming image is greater than that of the second trimming image, the data size of the second trimming is to be recorded in the memory card 8 and the like, which function as the recording section. On the other hand, when the data size of the first trimming image is smaller than that of the second trimming image, the first trimming image is to be recorded in the memory card 8 and the like, which function as the recording section. As such, the image pickup device 100 of the first embodiment records only data having a smaller size in the recording section at all times.

Therefore, in the image pickup device 100 according to the first embodiment, it becomes possible to reduce a recording capacity required for recording data of a still image acquired by the composition bracket photographing in the recording section. As a result, in the image pickup device 100 according to the first embodiment, it becomes possible to further reduce a capacity of the recording section as compared to conventional image pickup devices. Furthermore, as described above, in the image pickup device 100 according to the first embodiment, the plurality of subject images 44 and 45 can be recorded as one file or as a plurality of files associated with each other. Thus, in the image pickup device 100 according to the first embodiment, it becomes possible to easily allow the user or the like to simultaneously view the subject images 44 and 45 obtained at the same point of time.

Note that in step S111 of FIG. 2, the data of the image to be recorded may be or may not be compressed. The compression is performed in the form of JPEG, JPEG2000, PNG, TIFF or the like.

Furthermore, in FIG. 2, steps S106 and S107 may be executed prior to steps S104 and S105.

Furthermore, in the above embodiment, in step S108 shown in FIG. 2, the CPU 13 directly compares the data size of the first trimming image with that of the second trimming image. However, in step S108 shown in FIG. 2, prior to comparing the data size of the first trimming image with that of the second trimming image, the CPU 13 may add a predetermined value to the data size of the first trimming image or the data size of the second trimming image. Specifically, the CPU 13 may assign weights to the images when the data sizes thereof are compared with each other. Thus, in step S108 shown in FIG. 2, it can be set such that either the first trimming image or the second trimming image is more easily to be recorded in the recording section.

Alternatively, the data size of the first trimming image may be compared with that of the second trimming image by comparing the area of the image superimposed portion 46 shown in FIG. 3 with the sum of the areas of the extended areas 47 and 48. Specifically, when the area of the image superimposed portion 46 is greater than the sum of the areas of the extended areas 47 and 48, the second trimming image may be recorded in the recording section. On the other hand, when the area of the image superimposed portion 46 is smaller than the sum of the areas of the extended areas 47 and 48, the first trimming image may be recorded in the recording section.

Furthermore, as described above, the image pickup device 100 of the first embodiment performs composition bracket photographing once, thereby recording, in the recording section, the plurality of subject images 44 and 45 obtained at the same point of time. However, the image pickup device 100 of the first embodiment may perform the composition bracket photographing a plurality of times and superimpose upon each other the plurality of subject images which are picked up at different points of time, thereby recording the obtained images in the recording section. Specifically, for example, the image pickup device 100 of the first embodiment designates two subject images when a first composition bracket photographing is performed, and designates another two subject images when a second composition bracket photographing is performed. Then, these four subject images may be recorded by using a method of reducing a recording capacity as shown in FIG. 2. In this case, in FIG. 2, the shutter pressing operation is performed twice in step S101, two still images are stored in the SDRAM 5 in step S102, and subject images are designated from each of the two still images stored in step S103. Also, in step S106 shown in FIG. 6, the CPU 13 superimposes the two subject images designated when the first composition bracket photographing is performed upon said another two subject images designated when the second composition bracket photographing is performed, without changing positions at which the four subject images are disposed in the picked up still images having been stored, so as to acquire the second trimming image. In this case, the user or the like cannot easily simultaneously view images of subjects obtained at the same point of time.

Second Embodiment

An image pickup device 200 according to a second embodiment is the same as the image pickup device 100 (see FIG. 1) according to the first embodiment except for an operation performed by the CPU 13. Therefore, the second embodiment will also be described with reference to FIG. 1. For facilitating the understanding of the following description, in the second embodiment, a CPU 13-2 is used as the CPU 13 of FIG. 1. Furthermore, the components which have been already described in the first embodiment will not be further described below.

Figure 7:
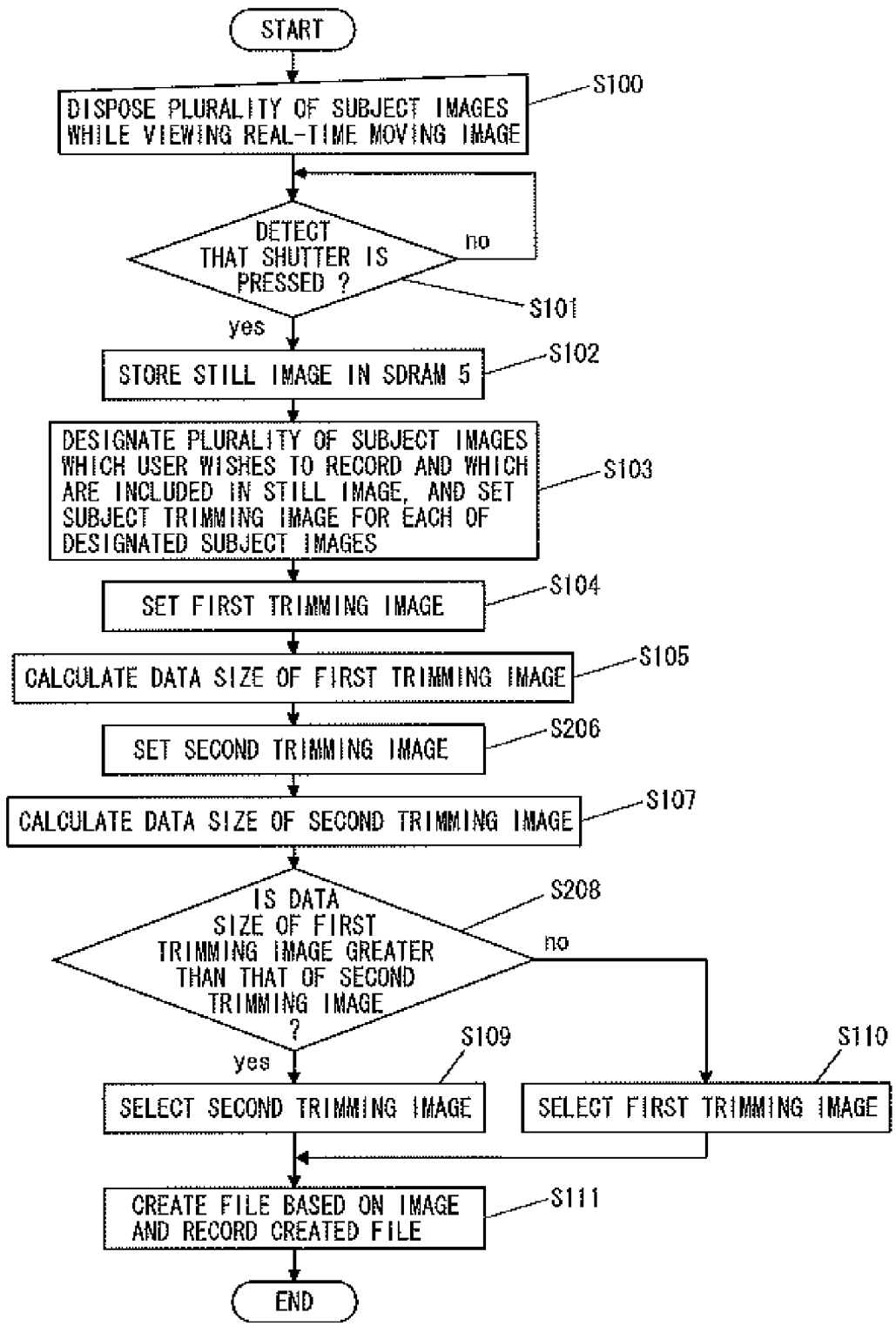
FIG. 7 is a flowchart describing a characteristic process to be executed by an image pickup device 200 from when a subject is picked up to when a still image is recorded in the recording section included therein.
Figure 8:
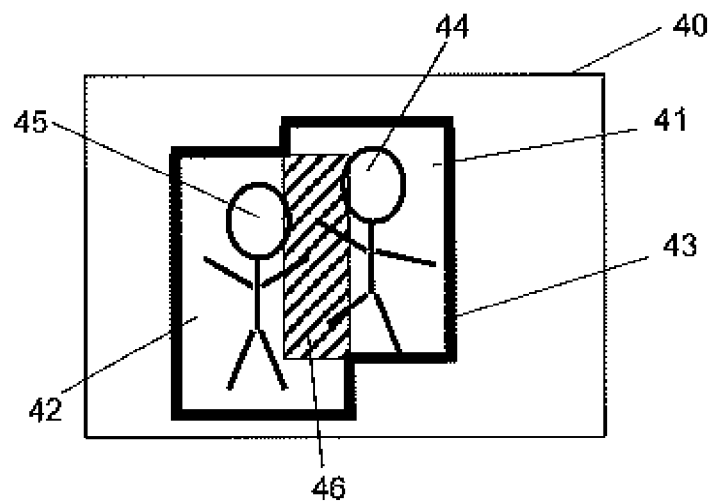
FIG. 8 is a diagram describing a second trimming image set by a CPU 13-2 in step S206.
Figure 9:
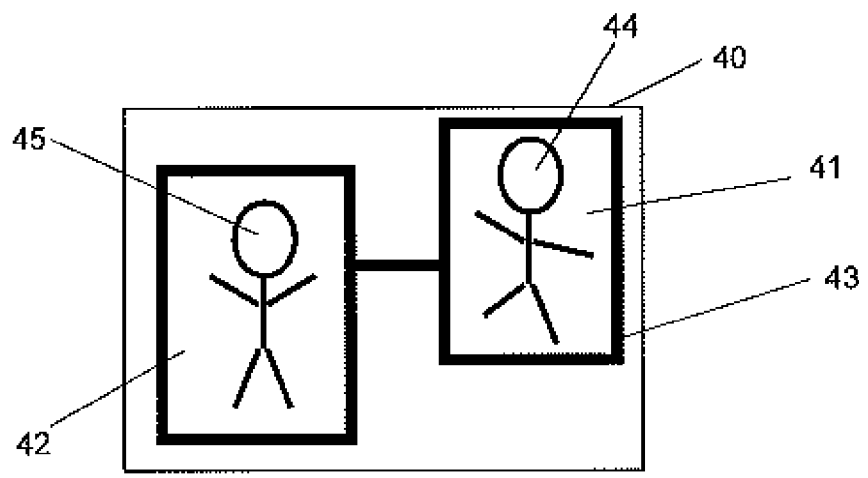
FIG. 9 is a diagram describing the second trimming image set by the CPU 13-2 in step S206.

FIG. 7 is a flowchart describing the characteristic process to be executed by the image pickup device 200 from when a subject is picked up to when a still image is recorded in the recording section included therein. The flowchart of FIG. 7 differs from that of FIG. 2 describing the process to be executed by the image pickup device 100 of the first embodiment in that in FIG. 7, step S206 replaces step S106, and step S208 replaces step S108. Note that the same steps of FIG. 7 as those of FIG. 2 will be denoted by the same reference numerals and will not be further described below. FIGS. 8 and 9 are diagrams describing the second trimming image to be set by the CPU 13-2 in step S206. FIG. 8 illustrates a case where the image superimposed portion 46 is present. FIG. 9 illustrates a case where the image superimposed portion 46 is not present.

Hereinafter, an operation of the image pickup device 200 will be described with reference to FIGS. 7 to 9. In step S206, the CPU 13-2 extracts the subject trimming image 43 which is an image including the subject trimming images 41 and 42, so as to be set as the second trimming image. In FIG. 9, since the subject trimming image 41 and the subject trimming image 42 are apart from each other, the second trimming image is set as an image in which the subject trimming image 41 is connected to the subject trimming image 42 through a line having no area. As shown in FIGS. 8 and 9, the second trimming image set in step S206 does not include any of the extended areas 47 to 49 (see FIGS. 3 to 6) which have been described in the first embodiment.

In step S208, the CPU 13-2 determines whether or not the data size of the first trimming image is greater than that of the second trimming image. Hereinafter, step S208 will be specifically described. When the image superimposed portion 46 is present as shown in FIG. 8, the CPU 13-2 determines that the data size of the first trimming image is greater than that of the second trimming image, and then advances the process to step S109. On the other hand, when the image superimposed portion 46 is not present, the CPU 13-2 determines that the data size of the first trimming image is equal to that of the second trimming image. As such, when the image superimposed portion 46 in not present, the user may select either step S109 or S110 as a subsequent step to be executed, or the process may be previously set to proceed to a predetermined step, for example.

As described above, the image pickup device 200 according to the second embodiment, the second trimming image does not include any extended areas (see FIGS. 3 to 6). Thus, in the image pickup device 200 according to the second embodiment, the extended areas are not to be recorded in the recording section in step S111 of FIG. 7. As a result, the image pickup device 200 of the second embodiment is able to further reduce a capacity of the recording section as compared to the image pickup device 100 of the first embodiment.

Note that in FIG. 9, the second trimming image may not include the line connecting the subject trimming image 41 to the subject trimming image 42. In this case, the second trimming image is not considered as one image, but as an image equal to the first trimming image.

Note that in step S111 of FIG. 7, the data of the image to be recorded may be or may not be compressed.

Furthermore, in FIG. 7, steps S206 and S107 may be executed prior to steps S104 and S105.

Furthermore, in step S208 of FIG. 7, the CPU 13-2 may assign weights to the images when the data sizes thereof are compared with each other, similarly to step S108 shown in FIG. 2 of the first embodiment.

Furthermore, similarly to the first embodiment, the image pickup device 200 of the second embodiment may perform the composition bracket photographing a plurality of times and superimpose upon each other the plurality of subject images which are picked up at different points of time, thereby recording the obtained images in the recording section.

Third Embodiment

An image pickup device 300 according to a third embodiment is the same as the image pickup device 100 (see FIG. 1) according to the first embodiment except for an operation performed by the CPU 13. Therefore, the third embodiment will also be described with reference to FIG. 1. For facilitating the understanding of the following description, in the third embodiment, a CPU 13-3 is used as the CPU 13 of FIG. 1. Furthermore, the components which have been already described in the first embodiment will not be further described below.

Figure 10:
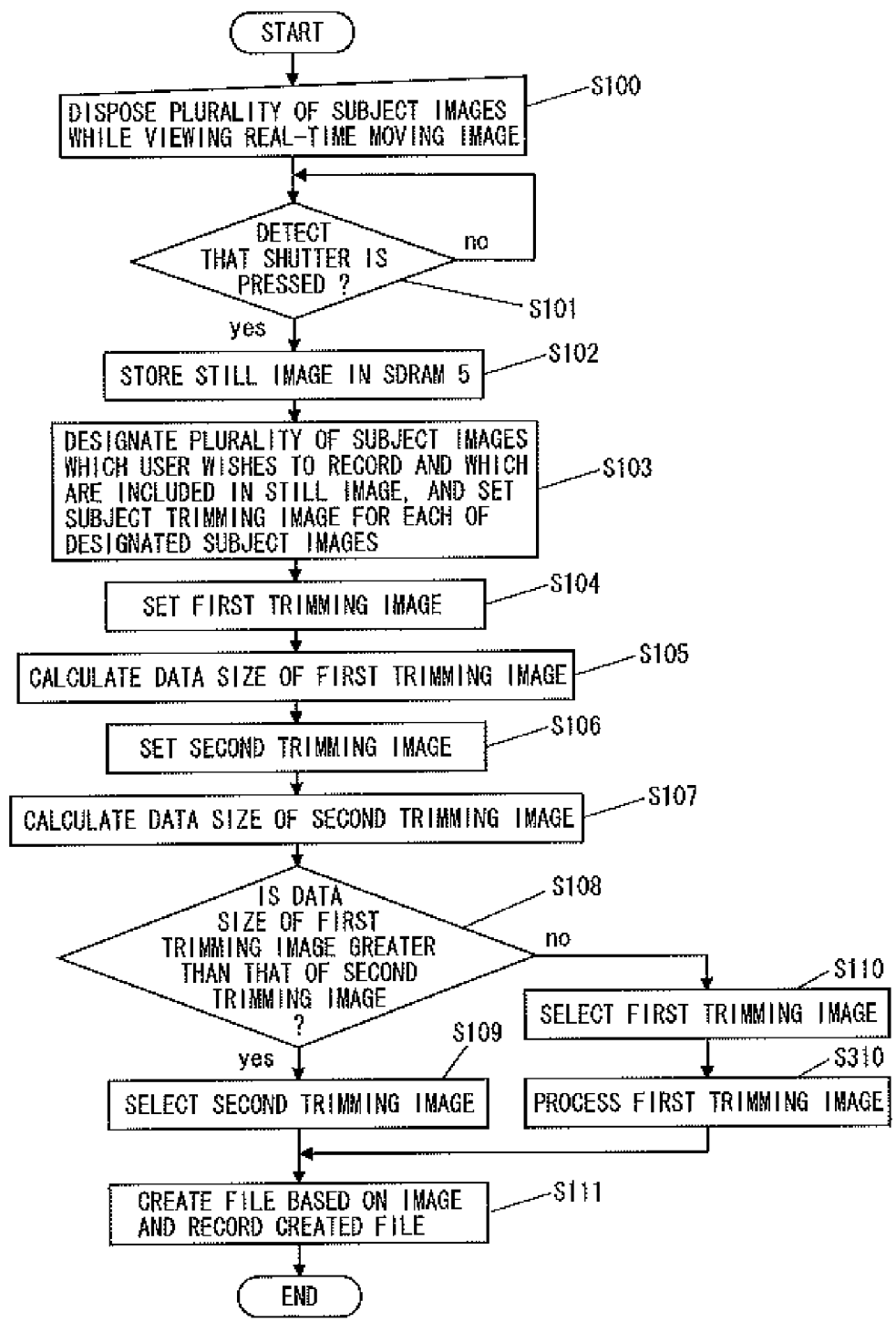
FIG. 10 is a flowchart describing a characteristic process to be executed by an image pickup device 300 from when a subject is picked up to when a still image is recorded in the recording section included therein.

FIG. 10 is a flowchart describing the characteristic process to be executed by the image pickup device 300 from when a subject is picked up to when a still image is recorded in the recording section included therein. The flowchart of FIG. 10 differs from that of FIG. 2 describing the process to be executed by the image pickup device 100 of the first embodiment in that in FIG. 10, step S310 is additionally provided subsequent to step S110 shown in FIG. 2. Note that the same steps of FIG. 10 as those of FIG. 2 will be denoted by the same reference numerals and will not be further described below.

In step S310, the CPU 13-3 processes the first trimming image selected in step S110. FIG. 11 is a diagram describing a processing executed by the CPU 13-3. FIG. 11 (a) illustrates the first trimming image selected in step S110, and FIGS. 11 (b) to (c) each illustrates the first trimming image which is processed in step S310. Hereinafter, an operation of the image pickup device 300 will be described with reference to FIGS. 10 and 11.

As shown in FIG. 11 (a), the first trimming image selected in step S110 is the first trimming image in which the subject trimming image 41 and the subject trimming image 42 are apart from each other. In step S310, the CPU 13-3 processes the subject trimming image 41 and the subject trimming image 42 into one rectangular-shaped image. Specifically, for example, as shown in FIG. 11 (b), the subject trimming image 41 is enlarged so as to be aligned with the subject trimming image 42, thereby creating one rectangular-shaped image. Alternatively, for example, as shown in FIG. 11 (c), the subject trimming image 42 is reduced so as to be aligned with the subject trimming image 41, thereby creating one rectangular-shaped image. Still alternatively, for example, as shown in FIG. 11 (d), a clipping range of the subject trimming image 41 is extended so as to be aligned with the subject trimming image 42, thereby creating one rectangular-shaped image. As described above, in step S310, the CPU 13-3 processes the first trimming image selected in step S110 into one rectangular-shaped first trimming image. Then, in step S111, the CPU 13-3 creates a file based on the rectangular shaped first trimming image, and records the created file in the recording section (see FIG. 1).

By executing the above-described process, an appearance of the first trimming image is improved when the user views the first trimming image recorded in the recording section on a display or views the first trimming image which is printed out on a paper.

Note that in step S310, the CPU 13-3 further processes the already-processed first trimming image into an image having a shape appropriate for a viewing method used by the user. Specifically, in step S13-3, the CPU 13-3 may crop the first trimming image so as to have an aspect ratio of a display of a wide-screen television, or to have an aspect ratio of a standard size (an A4 size, for example) of a printing paper, for example. Thus, an appearance of the first trimming image is further improved when the user views the first trimming image recorded in the recording section.

As described above, in the image pickup device 300 according to the third embodiment, a recording capacity can be reduced when the second trimming image is to be recorded in the recording section, similarly to the image pickup device 100 according to the first embodiment. Furthermore, in the image pickup device 300 of the third embodiment, when recording the first trimming image whose size is reduced (see FIG. 11 (c)), a capacity of the recording section can be further reduced as compared to the image pickup device 100 of the first embodiment. Furthermore, in the image pickup device 300 of the third embodiment, an appearance of the first trimming image is improved when the user views the first trimming image.

Note that in the third embodiment described above, step S310 is additionally provided in the flowchart of FIG. 2 describing the first embodiment. However, step S310 may be additionally provided subsequent to step S110 of FIG. 7 describing the second embodiment. In this case, as already described in the second embodiment, the extended areas are not to be recorded in the recording section, thereby making it possible to further reduce the capacity of the recording section.

Note that in step S111 of FIG. 10, the data of the image to be recorded may be or may not be compressed.

Furthermore, in FIG. 10, steps S106 and S107 may be executed prior to steps S104 and S105.

Furthermore, the CPU 13-3 may assign weights to the images when the data sizes thereof are compared with each other, similarly to step S108 shown in FIG. 2 of the first embodiment.

Furthermore, similarly to the first embodiment, the image pickup device 300 of the third embodiment may perform the composition bracket photographing a plurality of times and superimpose upon each other the plurality of subject images which are picked up at different points of time, thereby recording the obtained images in the recording section.

Fourth Embodiment

An image pickup device 400 according to a fourth embodiment is the same as the image pickup device 100 (see FIG. 1) according to the first embodiment except for an operation performed by the CPU 13. Therefore, the fourth embodiment will also be described with reference to FIG. 1. For facilitating the understanding of the following description, in the fourth embodiment, a CPU 13-4 is used as the CPU 13 of FIG. 1. Furthermore, the components which have been already described in the first embodiment will not be further described below.

Figure 12:
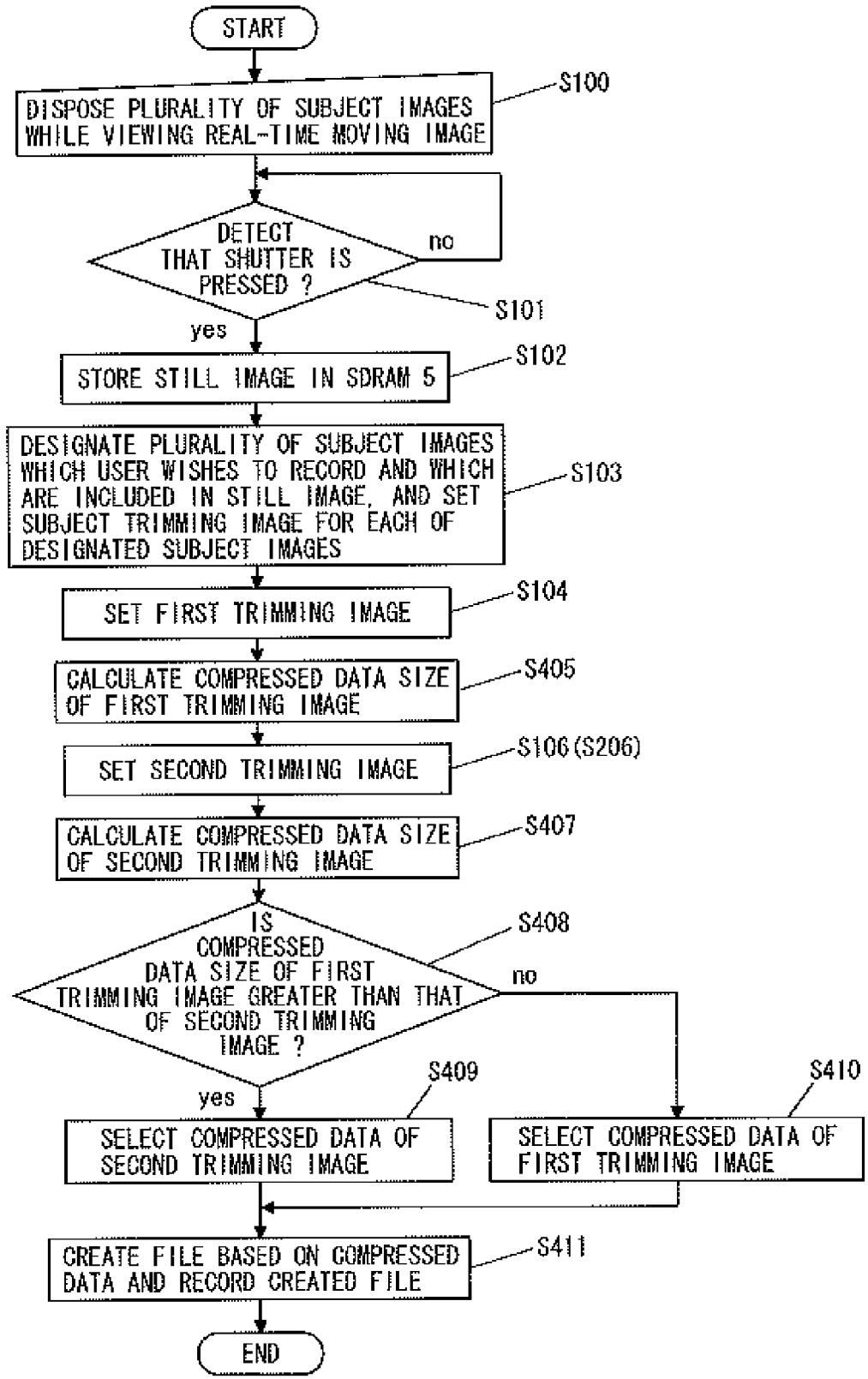
FIG. 12 is a flowchart describing a characteristic process to be executed by an image pickup device 400 from when a subject is picked up to when a still image is recorded in the recording section included therein.

FIG. 12 is a flowchart describing the characteristic process to be executed by the image pickup device 400 from when a subject is picked up to when a still image is recorded in the recording section included therein. The flowchart of FIG. 12 differs from that of FIG. 2 describing the process to be executed by the image pickup device 100 of the first embodiment in that in FIG. 12, step S405 replaces step S105, step S407 replaces step S107, step S408 replaces step S108, step S409 replaces step S109, step S410 replaces step S110, and step S411 replaces step S111. Note that the same steps of FIG. 12 as those of FIG. 2 will be denoted by the same reference numerals and will not be further described below.

Hereinafter, an operation of the image pickup device 400 will be described with reference to FIG. 12. In step S405, the CPU 13-4 compresses data of the first trimming image set in step S104, thereby calculating a compressed data size thereof. Similarly, in step S407, the CPU 13-4 compresses data of the second trimming image extracted in step S106, thereby calculating a compressed data size thereof. In step S408, the CPU 13-4 determines whether or not the compressed data size of the first trimming image calculated in step S405 is greater than that of the second trimming image calculated in step S407. When it is determined in step S408 that the compressed data size of the first trimming image is greater than that of the second trimming image, the process proceeds to step S409. On the other hand, when it is determined in step S408 that the compressed data size of the first trimming image is smaller than that of the second trimming image, the process proceeds to step S410.

Note that when the compressed data size of the first trimming image is equal to that of the second trimming image, the process may proceed to any step selected by the user, or may be previously set to proceed to a predetermined step.

In step S409, the CPU 13-4 selects the compressed data of the second trimming image calculated in step S407. Next, the CPU 13-4 creates a file based on the compressed data of the second trimming image having been selected, and records the created file in the nonvolatile memory 6 or the memory card 8 (step S411). Note that the user may select either the nonvolatile memory 6 or the memory card 8 as a location at which the compressed data of the second trimming image is to be recorded, or either the nonvolatile memory 6 or the memory card 8 may be previously set to record the compressed data of the second trimming image.

In step S410, the CPU 13-4 selects the compressed data of the first trimming image calculated in step S405. Then, the CPU 13-4 creates a file based on the compressed data of the compressed data of the first trimming image having been selected, and records the created file in the nonvolatile memory 6 or the memory card 8 (step S411). Note that the user may select either the nonvolatile memory 6 or the memory card 8 as a location at which the compressed data of the first trimming image is to be recorded, or either the nonvolatile memory 6 or the memory card 8 may be previously set to record the compressed data of the first trimming image.

As described above, in the image pickup device 400 according to the fourth embodiment, the compressed data size of the first trimming image is compared with the compressed data size of the second trimming image, and the smaller of the two compressed data size is to be recorded in the recording section.

Note that a data size obtained after compressing an image depends on characteristics of the image, characteristics of compression algorithm or the like. Therefore, even if the data size of one image is greater than that of the other image before the compression, the data size of the one image may become smaller than that of the other one after the compression.

Thus, in the image pickup device 400 according to the fourth embodiment, when recording the compressed first trimming image or the compressed second image in the recording section, a capacity of the recording section can be further reduced as compared to the image pickup device 100 according to the first embodiment.

Note that the above fourth embodiment illustrates an example where the second trimming image includes the extended areas (see FIGS. 3 to 6) on the basis of the flowchart of FIG. 2 describing the first embodiment. However, in FIG.

12, step S106 may replace step S206 shown in the flowchart of FIG. 7 of the second embodiment. In this case, the capacity of the recording section can be further reduced since the extended areas are not to be recorded in the recording section as described in the second embodiment.

Furthermore, in FIG. 12, steps S106 and S407 may be executed prior to steps S104 and S105.

Furthermore, in step S408 shown in FIG. 12, the CPU 13-4 may assign weights to the compressed images when the data sizes thereof are compared with each other, similarly to step S108 shown in FIG. 2 of the first embodiment.

Furthermore, similarly to the first embodiment, the image pickup device 400 of the fourth embodiment may perform the composition bracket photographing a plurality of times and superimpose upon each other the plurality of subject images which are picked up at different points of time, thereby recording the obtained images in the recording section.

Fifth Embodiment

An image pickup device 500 according to a fifth embodiment is the same as the image pickup device 100 (see FIG. 1) according to the first embodiment except for an operation performed by the CPU 13. Therefore, the fifth embodiment will also be described with reference to FIG. 1. For facilitating the understanding of the following description, in the fifth embodiment, a CPU 13-5 is used as the CPU 13 of FIG. 1. Furthermore, the components which have been already described in the first embodiment will not be further described below.

Figure 13:
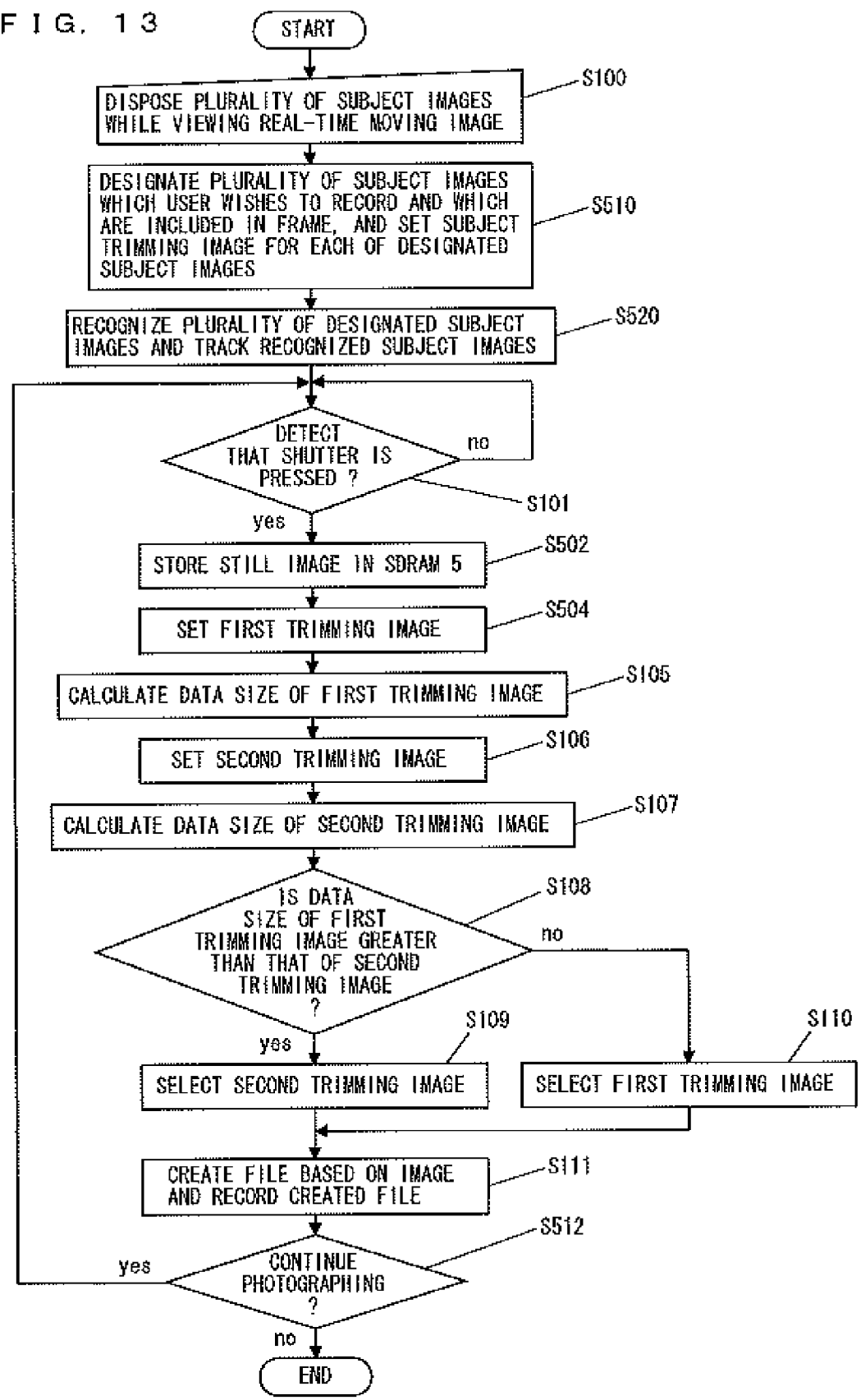
FIG. 13 is a flowchart describing a characteristic process to be executed by an image pickup device 500 from when a subject is picked up to when a still image is recorded in the recording section included therein.
Figure 14:
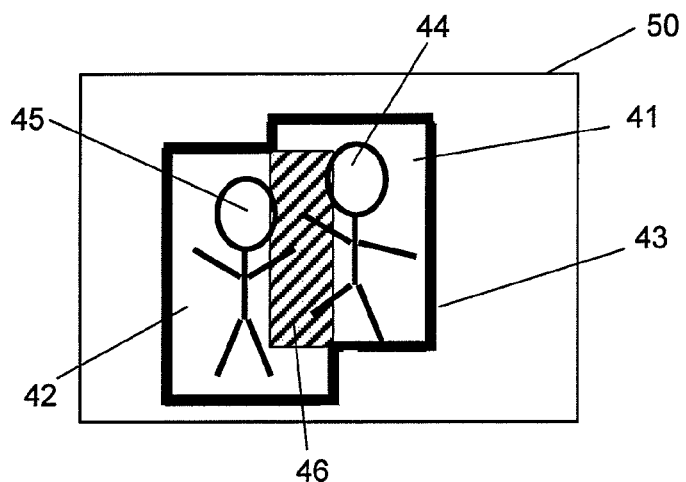
Figure 15:
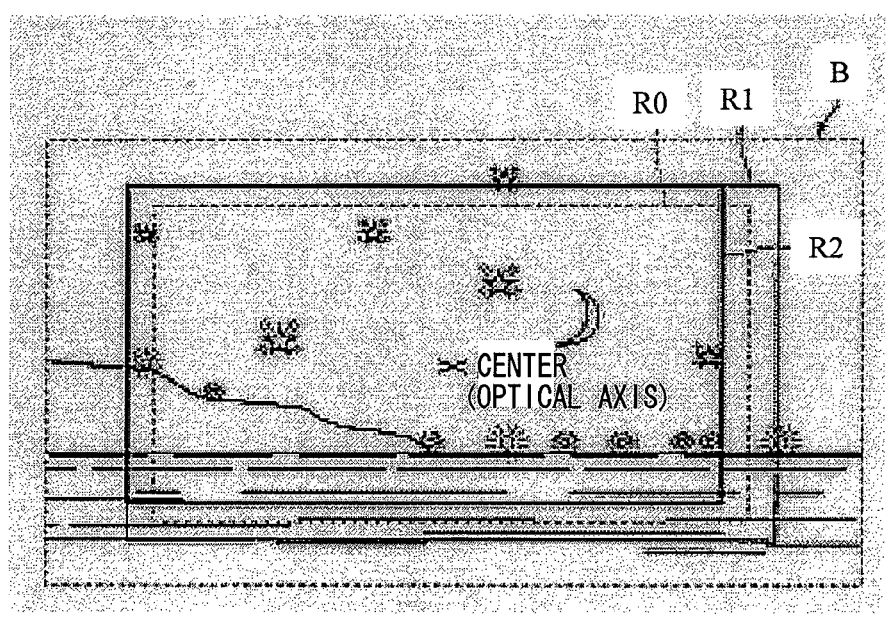
FIG. 15 is a diagram illustrating the composition bracket photographing performed by a conventional image pickup device disclosed in patent document 1.
Figure 16:
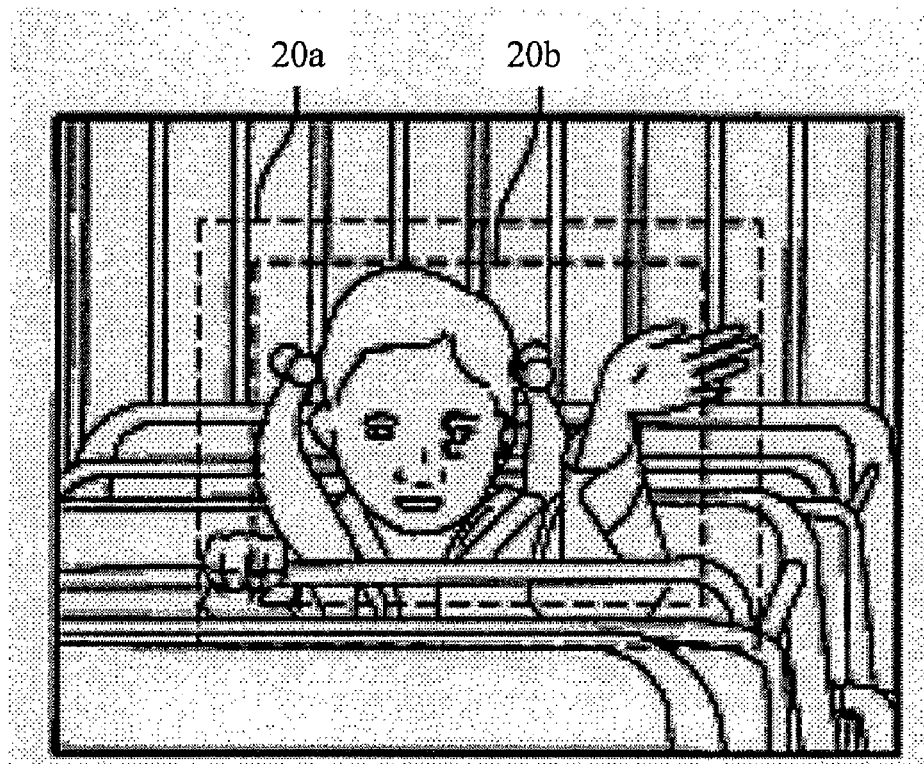
FIG. 16 is a diagram illustrating the composition bracket photographing performed by a conventional image pickup device disclosed in patent document 2.

FIG. 13 is a flowchart describing the characteristic process to be executed by the image pickup device 500 from when a subject is picked up to when a still image is recorded in the recording section included therein. The flowchart of FIG. 13 differs from that of FIG. 2 describing the process to be executed by the image pickup device 100 of the first embodiment in that in FIG. 13, steps S510 and S520 are additionally provided between step S100 and step S101, step S502 replaces step S102, step S103 is deleted, step S504 replaces step S104, and step S512 is additionally provided subsequent to step S111. Note that the same steps of FIG. 13 as those of FIG. 2 will be denoted by the same reference numerals and will not be further described below. FIG. 14 is a diagram describing step S510 and the like.

Hereinafter, an operation of the image pickup device 500 will be described with reference to FIGS. 13 and 14. In step S510, in accordance with an instruction from the user, the CPU 13-5 designates the plurality of subject images 44 and 45, both of which are disposed in a frame 50 of a real-time moving image in step S100. Also, in step S510, the CPU 13-5 sets the subject trimming image 41 including the designated subject image 44 and the subject trimming image 42 including the designated subject image 45 in the real-time moving image. In this case, the user issues an instruction to designate a plurality of subject images by using the operation section 9, while viewing the real-time moving image displayed on the display section 10.

Next, in step S520, the CPU 13-5 recognizes the plurality of subject images designated in step S510 and tracks the plurality of recognized subject images, thereby causing positions of the subject trimming images 41 and 42 to be moved within the real-time moving image such that the subject trimming image 41 includes the subject image 44 and the subject trimming image 42 includes the subject image 45 at all times. Note that a well-known technique such as pattern matching may be used for recognizing and tracking the subject images.

Thereafter, the user performs the shutter pressing operation, and then the CPU 13-5 detects that a shutter is pressed (step S101).

In step S502, by using the real-time moving image, the CPU 13-5 creates a still image acquired at a time when the CPU 13-5 detects that the shutter is pressed, and temporarily stores the created still image in the SDRAM 5. Note that the still image created in step S502 has position information of the subject trimming images 41 and 42 associated therewith, which position information is obtained when the CPU 13-5 detects that the shutter is pressed.

Next, in step S504, by using the position information associated with the still image, the CPU 13-5 extracts, one by one, the subject trimming images 41 and 42 from the still image stored in step S502, so as to be set as the first trimming image. Then, the CPU 13-5 calculates a data size of the first trimming image set in step S504 (step S105). Thereafter, an operation from steps S106 to S111 is performed. After step S111, when the composition bracket photographing continues, the process returns to step S101, while when the composition bracket photographing does not continue, the process is to be finished (step S512).

By executing the process described above, the image pickup device 500 according to the fifth embodiment does not require the user to designate a plurality of subjects each time composition bracket photographing is performed, while obtaining an effect similar to that of the image pickup device 100 of the first embodiment. That is, according to the image pickup device 500, the user is able to consecutively perform the composition bracket photographing, while reducing a recording capacity, by only designating once a plurality of subject images that the user wishes to record.

Note that the above fifth embodiment illustrates an example where the image pickup device 500 is realized by modifying the process to be executed by the image pickup device 100 of the first embodiment (see FIG. 2). However, the image pickup device 500 of the fifth embodiment may be realized by modifying any of the processes executed by the image pickup devices 200 to 400 of the second to fourth embodiments (see FIGS. 7, 10 and 12). That is, the image pickup device 500 of the fifth embodiment may be any image pickup device which designates a subject image in a real-time moving image and tracks the designated subject image, thereby recording the subject image currently being tracked while reducing a recording capacity of the image pickup device each time the shutter is pressed.

Note that in step S111 of FIG. 13, the data of the image to be recorded may be or may not be compressed.

Furthermore, in FIG. 13, steps S106 and S107 may be executed prior to steps S504 and S105.

Furthermore, in step S108 of FIG. 13, the CPU 13-5 may assign weights to the images when the data sizes thereof are compared with each other, similarly to step S108 shown in FIG. 2 of the first embodiment.

In the image pickup device 100 to 500 (see FIG. 1) described in the first to fifth embodiments, the signal processing/AD conversion circuit 3, the correction circuit 4 and the CPU 13 (13-2 to 13-5) can be respectively implemented as LSIs, integrated circuits. These components may be individually integrated on a single chip or nay also be integrated on a single chip so as to include a part or the whole thereof. Here, the term, LSI is used, but it may also be referred to as IC, system LSI, super LSI or ultra-LSI or the like depending on the difference in the degree of integration.

Furthermore, the technique of implementing an integrated circuit is not limited to an LSI, but an integrated circuit may also be implemented with a dedicated circuit or generalpurpose processor. It is also possible to use an FPGA (Field Programmable Gate Array) which is programmable after manufacturing an LSI or a reconfigurable processor whereby connections or settings of circuit cells inside the LSI are reconfigurable. Moreover, when technologies for implementing an integrated circuit substitutable for an LSI emerges with the advance of semiconductor technology or other derived technologies, those technologies may of course be used to integrate functional blocks. One of those possible technologies is biotechnology.

INDUSTRIAL APPLICABILITY

The present invention is applicable to an image pickup device and the like, and more particularly to an image pickup device capable of reducing a recording capability thereof when the composition bracket photographing is performed.

The invention claimed is:

1. An image pickup device that performs composition bracket photographing comprising:
    an image pickup section operable to pick up a subject so as to acquire a picked-up image;
    an image processing section operable to process the picked-up image acquired by the image pickup section; and
    a recording section operable to record the picked-up image processed by the image processing section, wherein
    the image processing section includes:
        subject trimming image designating means for designating a plurality of subject trimming images generated by respectively clipping out a plurality of subject images included in the picked-up image acquired by the image pickup section;
        first trimming image setting means for setting the plurality of subject trimming images as a first trimming image;
        second trimming image setting means for setting an image encompassing the plurality of subject trimming images as a second trimming image;
        first data size calculating means for calculating a data size of the first trimming image;
        second data size calculating means for calculating a data size of the second trimming image;
        comparison means for comparing the data size of the first trimming image with the data size of the second trimming image; and
        selection means for selecting one of the first trimming image and the second trimming image to be recorded in the recording section, one of the first trimming image and the second trimming image determined by the comparison means that the data size of the selected image is smaller than that of the other one.

2. The image pickup device according to claim 1, wherein each of the plurality of subject trimming images designated by the subject trimming image designating means has a rectangular shape, and
the second trimming image set by the second trimming image setting means has a rectangular shape.

3. The image pickup device according to claim 1, wherein the second trimming image set by the second trimming image setting means does not include any area which is not included in the plurality of subject trimming images.

4. The image pickup device according to claim 3, wherein each of the plurality of subject trimming images designated by the subject trimming image designating means has a rectangular shape.

5. The image pickup device according to claim 1, wherein each of the plurality of subject trimming images designated by the subject trimming image designating means has a rectangular shape, and
when the first trimming image is selected, the selection means processes the plurality of subject trimming images into the first trimming image having a rectangular shape by enlarging or reducing at least one of the plurality of subject trimming images so as to be aligned with the other subject trimming images.

6. The image pickup device according to claim 1, wherein the data size of the first trimming image calculated by the first data size calculating means is a data size obtained after a compression process is performed, and
the data size of the second trimming image calculated by the second data size calculating means is a data size obtained after a compression process is performed.

7. The image pickup device according to claim 1, wherein the picked-up image acquired by the image pickup section is a real-time moving image in which real-time movement of the subject is reflected, and
the subject trimming image designating means tracks the plurality of subject images included in the real-time moving image so as to designate the plurality of subject trimming images generated by respectively clipping out the plurality of subject images.

8. An image pickup method that performs composition bracket photographing comprising:
    an image pickup step of picking up a subject so as to acquire a picked-up image;
    an image processing step of processing the picked-up image acquired in the image pickup step; and
    a recording step of recording the picked-up image processed in the image processing step, wherein
    the image processing step includes the steps of:
        designating a plurality of subject trimming images generated by respectively clipping out a plurality of subject images included in the picked-up image acquired by the image pickup section;
        setting the plurality of subject trimming images as a first trimming image;
        setting an image encompassing the plurality of subject trimming images as a second trimming image;
        calculating a data size of the first trimming image;
        calculating a data size of the second trimming image;
        comparing the data size of the first trimming image with the data size of the second trimming image; and
        selecting one of the first trimming image and the second trimming image to be recorded in the recording step, one of the first trimming image and the second trimming image determined by the step of comparing the data size of the first trimming image with the data size of the second trimming image that the data size of the selected image is smaller than that of the other one.

9. An integrated circuit integrated into an image pickup device that performs composition bracket photographing which processes a picked-up image acquired by picking up a subject and records the processed image, the integrated circuit executing functions as:
    a signal processing/AD conversion circuit for performing a noise reduction processing and a gain control on an output signal of a CCD for picking up a subject and for converting the output signal from an analog signal into a digital signal;

a correction circuit for performing an image correction processing on the output signal of the signal processing/AD conversion circuit so as to obtain the picked-up image; and an image processing section for designating a plurality of subject trimming images generated by respectively clipping out a plurality of subject images included in the picked-up image obtained by the correction circuit so as to set the plurality of designated subject trimming images as a first trimming image, for setting an image encompassing the plurality of subject trimming images as a second trimming image, for calculating a data size of the first trimming image with a data size of the second trimming image so as to compare the data sizes of the first trimming image and the second trimming image with each other, and for selecting one of the first trimming image and the second trimming image to be recorded, whose data size is smaller than that of the other one.

* * * * *